US012379249B2

(12) United States Patent
Janiczek et al.

(10) Patent No.: US 12,379,249 B2
(45) Date of Patent: Aug. 5, 2025

(54) SYSTEMS AND METHODS FOR DIFFERENTIABLE PROGRAMMING FOR HYPERSPECTRAL UNMIXING

(71) Applicants: John Janiczek, Tempe, AZ (US); Suren Jayasuriya, Tempe, AZ (US); Gautam Dasarathy, Tempe, AZ (US); Christopher Edwards, Flagstaff, AZ (US); Philip Christensen, Tempe, AZ (US)

(72) Inventors: John Janiczek, Tempe, AZ (US); Suren Jayasuriya, Tempe, AZ (US); Gautam Dasarathy, Tempe, AZ (US); Christopher Edwards, Flagstaff, AZ (US); Philip Christensen, Tempe, AZ (US)

(73) Assignees: ARIZONA BOARD OF REGENTS ON BEHALF OF ARIZONA STATE UNIVERSITY, Tempe, AZ (US); ARIZONA BOARD OF REGENTS FOR AND ON BEHALF OF NORTHERN ARIZONA UNIVERSITY, Flagstaff, AZ (US)

( * ) Notice: Subject to any disclaimer, the term of this patent is extended or adjusted under 35 U.S.C. 154(b) by 559 days.

(21) Appl. No.: 17/353,077

(22) Filed: Jun. 21, 2021

(65) Prior Publication Data
US 2021/0396580 A1    Dec. 23, 2021

Related U.S. Application Data

(60) Provisional application No. 63/041,733, filed on Jun. 19, 2020.

(51) Int. Cl.
*G01J 3/28* (2006.01)

(52) U.S. Cl.
CPC ..... *G01J 3/2823* (2013.01); *G01J 2003/2826* (2013.01); *G01J 2003/2843* (2013.01)

(58) Field of Classification Search
CPC ............ G01J 3/2823; G01J 2003/2826; G01J 2003/2843; G06V 10/82
See application file for complete search history.

(56) References Cited

U.S. PATENT DOCUMENTS

| | | | |
|---|---|---|---|
| 6,675,106 B1* | 1/2004 | Keenan | G01J 3/28 |
| | | | 702/194 |
| 7,180,588 B2* | 2/2007 | Geshwind | G01J 3/0208 |
| | | | 356/330 |
| 7,376,327 B2* | 5/2008 | Galstian | B82Y 10/00 |
| | | | 385/140 |
| 2002/0131691 A1* | 9/2002 | Garrett | G02B 6/29395 |
| | | | 385/24 |

(Continued)

OTHER PUBLICATIONS

Sunshine, et al., Determining the composition of olivine from reflectance spectroscopy. Journal of Geophysical Research: Planets 103(E6), 13675-13688 (1998).

(Continued)

*Primary Examiner* — Tung S Lau
(74) *Attorney, Agent, or Firm* — Polsinelli PC

(57) ABSTRACT

Various embodiments of a system for linear unmixing of spectral images using a dispersion model are disclosed herein.

16 Claims, 10 Drawing Sheets
(8 of 10 Drawing Sheet(s) Filed in Color)

(56) References Cited

U.S. PATENT DOCUMENTS

2003/0123827 A1* 7/2003 Salerno ............... B82Y 20/00
385/27
2005/0047705 A1* 3/2005 Domash ............... G02F 1/011
385/10

OTHER PUBLICATIONS

Tsai, et al., Beyond volumetric albedo—A surface optimization framework for non-line-of-sight imaging. IEEE Intl. Conf. Computer Vision and Pattern Recognition (CVPR) (2019).
Wang, et al., Backpropagation with callbacks: Foundations for efficient and expressive differentiable programming. Advances in Neural Information Processing Systems. pp. 10180-10191 (2018).
Wang, et al., Demystifying differentiable programming: Shift/reset the penultimate backpropagator. Proceedings of the ACM on Programming Languages 3(ICFP), 1-31 (2019).
Wenrich, et al., Optical constants of minerals derived from emission spectroscopy: Application to quartz. Journal of Geophysical Research: Solid Earth 101(B7), 15921-15931 (1996).
Yang, et al., Hyperspectral image classification with deep learning models. IEEE Transactions on Geoscience and Remote Sensing 56(9), 5408-5423 (2018).
Yu, et al., Inverserendernet: Learning single image inverse rendering. Proceedings of the IEEE Conference on Computer Vision and Pattern Recognition. pp. 3155-3164 (2019).
Zare, et al., Sparsity promoting iterated constrained endmember detection in hyperspectral imagery. IEEE Geoscience and Remote Sensing Letters 4(3), 446-450 (2007).
Zare, et al., Hyperspectral band selection and endmember detection using sparsity promoting priors. IEEE Geoscience and Remote Sensing Letters 5(2), 256-260 (2008).
Zare, et al., Endmember variability in hyperspectral analysis: Addressing spectral variability during spectral unmixing. IEEE Signal Processing Magazine 31(1), 95-104 (2013).
Zhang, et al., A differential theory of radiative transfer. ACM Transactions on Graphics (TOG) 38(6), 1-16 (2019).
Zhang, et al., Deep learning for remote sensing data: A technical tutorial on the state of the art. IEEE Geoscience and Remote Sensing Magazine 4(2), 22-40 (2016).
Zhang, et al., Spectral-spatial weighted sparse regression for hyperspectral image unmixing. IEEE Transactions on Geoscience and Remote Sensing 56(6), 3265-3276 (2018).
Zhao, et al., Spectral-spatial feature extraction for hyperspectral image classification: A dimension reduction and deep learning approach. IEEE Transactions on Geoscience and Remote Sensing 54(8), 4544-4554 (2016).
Zhou, et al., A gaussian mixture model representation of endmember variability in hyperspectral unmixing. IEEE Transactions on Image Processing 27(5), 2242-2256 (2018).
Chang, Hyperspectral imaging: techniques for spectral detection and classification, vol. 1. Springer Science & Business Media (2003).
Azinovic, et al., Inverse path tracing for joint material and lighting estimation, Proceedings of the IEEE Conference on Computer Vision and Pattern Recognition. pp. 2447-2456 (2019).
Bandfield, Global mineral distributions on Mars, Journal of Geophysical Research: Planets 107(E6), 9-1 (2002).
Bateson, et al., Endmember bundles: A new approach to incorporating endmember variability into spectral mixture analysis, IEEE Transactions on Geoscience and Remote Sensing 38(2), 1083-1094 (2000).
Baydin, et al., Automatic differentiation in machine learning: a survey. The Journal of Machine Learning Research 18(1), 5595-5637 (2017).
Bhojanapalli, et al., Dropping convexity for faster semi-definite optimization, Conference on Learning Theory. pp. 530-582 (2016).
Borsoi, et al., Spectral variability in hyper-spectral data unmixing: A comprehensive review. arXiv preprint arXiv:2001.07307 (2020).
Burns, Crystal field spectra and evidence of cation ordering in olivine minerals, American Mineralogist: Journal of Earth and Planetary Materials 55(9-10), 1608-1632 (1970).
Chen, et al., Sparse hyperspectral unmixing based on constrained lp-l2 optimization. IEEE Geoscience and Remote Sensing Letters 10(5), 1142-1146 (2013).
Chen, et al., Deep feature extraction and classification of hyperspectral images based on convolutional neural networks. IEEE Transactions on Geoscience and Remote Sensing 54(10), 6232-6251 (2016).
Cheng, et al., Exploring hierarchical convolutional features for hyperspectral image classification. IEEE Transactions on Geoscience and Remote Sensing 56(11), 6712-6722 (2018).
Chouzenoux, et al., Fast constrained least squares spectral unmixing using primal-dual interior-point optimization. IEEE Journal of Selected Topics in Applied Earth Observations and Remote Sensing 7(1), 59-69 (2014).
Christensen, et al., Mars global surveyor thermal emission spectrometer experiment: investigation description and surface science results. Journal of Geophysical Research: Planets 106(E10), 23823-23871 (2001).
Christensen, et al., The osiris-rex thermal emission spectrometer (otes) instrument. Space Science Reviews 214(5), 87 (2018).
Combe, et al., Analysis of omega/mars express data hyperspectral data using a multiple-endmember linear spectral unmixing model (melsum): Methodology and first results. Planetary and Space Science 56(7), 951-975 (2008).
Du, et al., Spatial and spectral unmixing using the beta compositional model. IEEE Journal of Selected Topics in Applied Earth Observations and Remote Sensing 7(6), 1994-2003 (2014).
Duchi, et al., Solving (most) of a set of quadratic equalities: Composite optimization for robust phase retrieval. Information and Inference: A Journal of the IMA 8(3), 471-529 (2019).
Engel, et al., Differentiable digital signal processing. International Conference on Learning Representations (2020).
Feely, et al., Quantitative compositional analysis using thermal emission spectroscopy: Application to igneous and metamorphic rocks. Journal of Geophysical Research: Planets 104(E10), 24195-24210 (1999).
Gader, et al., Muufl gulfport hyperspectral and lidar airborne data set. Univ. Florida, Gainesville, FL, USA, Tech. Rep. REP-2013-570 (2013).
Gkioulekas, et al., An evaluation of computational imaging techniques for heterogeneous inverse scattering. European Conference on Computer Vision. pp. 685-701. Springer (2016).
Gkioulekas, et al., Inverse volume rendering with material dictionaries. ACM Transactions on Graphics (TOG) 32(6), 162 (2013).
Goudge, et al., Integrating crism and tes hyperspectral data to characterize a halloysite-bearing deposit in kashira crater, mars. Icarus 250, 165-187 (2015).
Heinz, et al.: Fully constrained least squares linear spectral mixture analysis method for material quantification in hyperspectral imagery. IEEE Transactions on Geoscience and Remote Sensing 39(3), 529-545 (2001).
Heylen, et al., A review of nonlinear hyperspectral unmixing methods. IEEE Journal of Selected Topics in Applied Earth Observations and Remote Sensing 7(6), 1844-1868 (2014).
Hu, et al., Deep convolutional neural networks for hyperspectral image classification. Journal of Sensors 2015 (2015).
Jain, et al.: Non-convex optimization for machine learning. Foundations and Trends (R) in Machine Learning 10(3-4), 142-336 (2017).
Keshava, et al., Spectral unmixing. IEEE Signal Processing Magazine 19(1), 44-57 (2002).
Klingelhöfer, et al.: Jarosite and hematite at meridiani planum from opportunity's mössbauer spectrometer. Science 306(5702), 1740-1745 (2004).
Larkin, Infrared and Raman spectroscopy: principles and spectral interpretation. Elsevier (2017).
Lee, et al., Gradient descent converges to minimizers. arXiv preprint arXiv:1602.04915 (2016).

(56) References Cited

OTHER PUBLICATIONS

Lee, et al., Optical constants of soot in hydrocarbon flames. Symposium (international) on combustion. vol. 18, pp. 1159-1166. Elsevier (1981).

Li, et al., Deep learning for hyperspectral image classification: An overview. IEEE Transactions on Geo-science and Remote Sensing 57(9), 6690-6709 (2019).

Li, et al., Differentiable monte carlo ray tracing through edge sampling. ACM Trans. Graph. (Proc. SIGGRAPH Asia) 37(6), 222:1-222:11 (2018).

Li, et al., Spectral-spatial classification of hyperspectral imagery with 3d convolutional neural network. Remote Sensing 9(1), 67 (2017).

Liu, et al., Active deep learning for classification of hyperspectral images. IEEE Journal of Selected Topics in Applied Earth Observations and Remote Sensing 10(2), 712-724 (2016).

Loubet, et al., Reparameterizing discontinuous integrands for differentiable rendering. Transactions on Graphics (Proceedings of SIGGRAPH Asia) 38(6) (Dec. 2019). https://doi.org/10.1145/3355089.3356510.

Lu, et al., Medical hyperspectral imaging: a review. Journal of Biomedical Optics 19(1), 010901 (2014).

Moersch, et al., Thermal emission from particulate surfaces: A comparison of scattering models with measured spectra. Journal of Geophysical Research: Planets 100(E4), 7465-7477 (1995).

Nimier-David, et al., Mitsuba 2: A retargetable forward and inverse renderer. Transactions on Graphics (Proceedings of SIGGRAPH Asia).

Paszke, et al., Automatic differentiation in pytorch (2017).

Paszke, et al.: Pytorch: An imperative style, high-performance deep learning library. Advances in Neural Information Processing Systems. pp. 8024-8035 (2019).

Ramsey, et al., Mineral abundance determination: Quantitative deconvolution of thermal emission spectra. Journal of Geophysical Research: Solid Earth 103(B1), 577-596 (1998).

Ramsey, Mineral abundance determination: Quantitative deconvolution of thermal emission spectra: Application to analysis of martian atmospheric particulates. Journal of Geophysical Research: Solid Earth (2000).

Ravi, et al., Pytorch3d. https://github.com/facebookresearch/pytorch3d (2020).

Roberts, et al., Mapping chaparral in the santa monica mountains using multiple endmember spectral mixture models. Remote Sensing of Environment 65(3), 267-279 (1998).

Rogers, et al., Mineralogical composition of sands in meridiani planum determined from mars exploration rover data and comparison to orbital measurements. Journal of Geophysical Research: Planets 113(E6) (2008).

Salisbury, et al., Thermal infrared remote sensing of crude oil slicks. Remote Sensing of Environment 45(2), 225-231 (1993).

Spitzer, et al., Infrared lattice bands of quartz. Physical Review 121(5), 1324 (1961).

Stein, Application of the normal compositional model to the analysis of hyper-spectral imagery. IEEE Workshop on Advances in Techniques for Analysis of Remotely Sensed Data, 2003. pp. 44-51. IEEE (2003).

\* cited by examiner

SYSTEMS AND METHODS FOR DIFFERENTIABLE PROGRAMMING FOR HYPERSPECTRAL UNMIXING

CROSS-REFERENCE TO RELATED APPLICATIONS

This is a non-provisional application that claims benefit to U.S. Provisional Patent Application Ser. No. 63/041,733 filed 19 Jun. 2020, which is herein incorporated by reference in its entirety.

FIELD

The present disclosure generally relates to spectral imaging; and in particular, to a system and associated method for hyperspectral unmixing to quantify material presence in mixtures.

BACKGROUND

Hyperspectral imaging is a method of imaging where light radiance is densely sampled at multiple wavelengths. Increasing spectral resolution beyond a traditional camera's red, green, and blue spectral bands typically requires more expensive detectors, optics, and/or lowered spatial resolution. However, hyper-spectral imaging has demonstrated its utility in computer vision, biomedical imaging, and remote sensing. In particular, spectral information is critically important for understanding material reflectance and emission properties for recognizing materials.

Spectral unmixing is a specific task within hyperspectral imaging with application to many land classification problems related to ecology, hydrology, and mineralogy. It is particularly useful for analyzing aerial images from aircraft or spacecraft to map the abundance of materials in a region of interest. While pure materials have characteristic spectral features, mixtures require additional adaptations to identify and quantify material presence.

It is with these observations in mind, among others, that various aspects of the present disclosure were conceived and developed.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Corresponding reference characters indicate corresponding elements among the view of the drawings. The headings used in the figures do not limit the scope of the claims.

DETAILED DESCRIPTION

Figure 1:
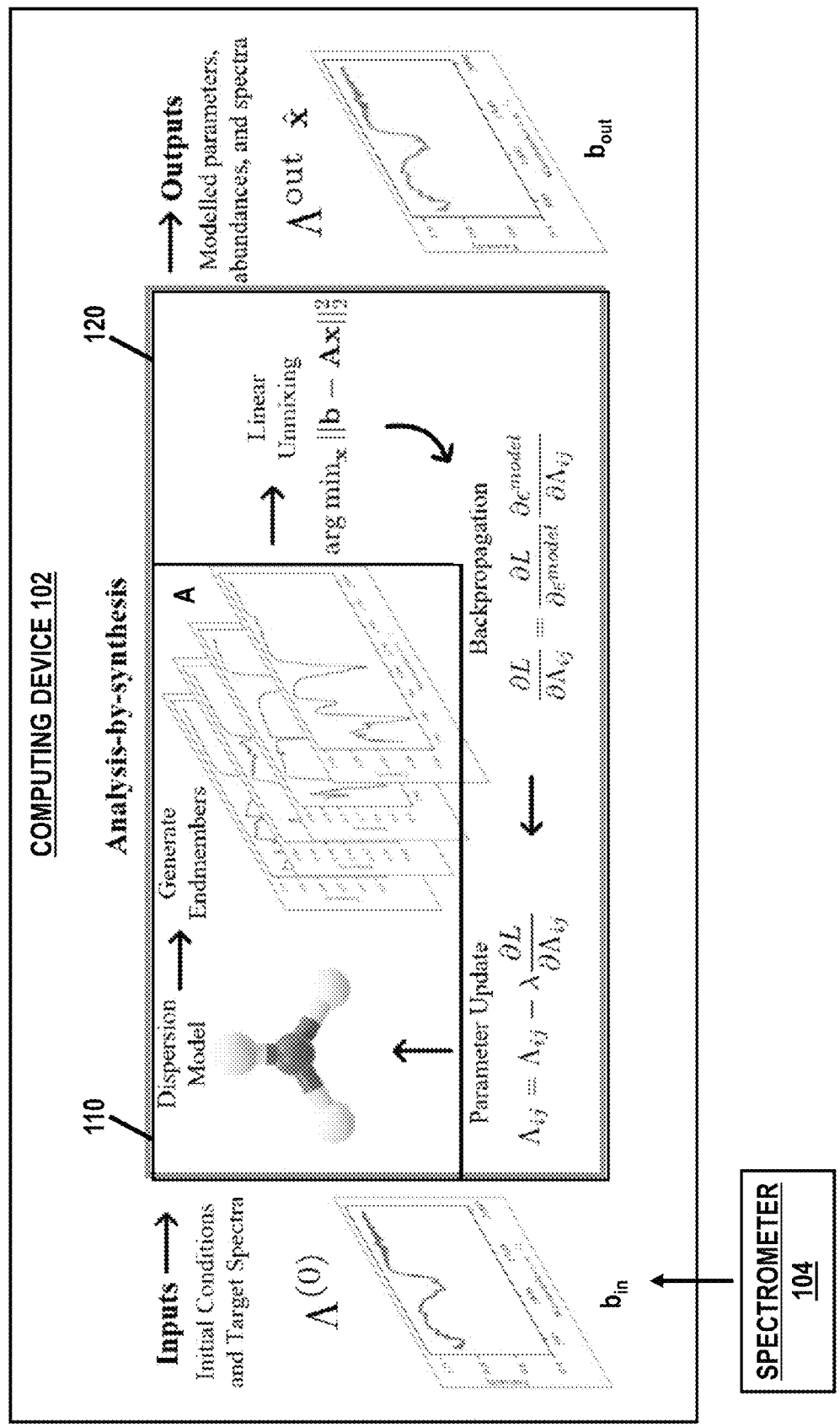
FIG. 1 is a diagram showing a differentiable programming pipeline to perform spectral unmixing.

Various embodiments of a system and associated method for hyperspectral unmixing of measured spectra for quantifying pure materials in a mixture are described herein. Spectral variation in the mixture is identified by a dispersion model and incorporated into an end-to-end spectral unmixing system via differentiable programming that iteratively optimizes the dispersion model and identifies an abundance of each material in the mixture. A dispersion model is introduced into the unmixing system to simulate realistic spectral variation. Then, this dispersion model is utilized as a generative model within the spectral unmixing system utilizing an analysis-by-synthesis method to quantify materials in an observed mixture and optimizes parameters of the dispersion model. Further, a technique for inverse rendering using a convolutional neural network to predict parameters of the generative model is introduced to enhance performance and speed when training data is available. State-of-the-art results were achieved on both infrared and visible-to-near-infrared (VNIR) datasets as compared to baselines, and show promise for the synergy between physics-based dispersion models and deep learning in hyperspectral unmixing in the future. Referring to the drawings, embodiments of systems and an associated method for hyperspectral unmixing are illustrated and generally indicated as 100, 200 and 300 in FIGS. 1-10.

Referring to FIG. 1, an end-to-end spectral unmixing system 100 is shown which uses differentiable programming to perform analysis-by-synthesis optimization of model parameters and identify abundances of a material in a measured spectra b of the mixture. The measured spectra b is received at a computing device 102 from a spectrometer 104 and can be representative of all measured material spectra in the mixture. The spectral unmixing system 100 incorporates a generative dispersion model 110 with an unmixing pipeline 120 via differentiable programming to fit the dispersion model 110 to measured spectra and iteratively optimize parameters of the dispersion model 110 that recreate the measured spectra. The dispersion model 110 simulates spectral variability of materials to realistically fit a model that mimics real measured spectra b. The spectral unmixing system 100 jointly optimizes the dispersion model parameters $\wedge$ and material abundances x with an analysis-by-synthesis optimization process 300. A second embodiment of the system 200 is introduced for tasks where additional data is available by training a CNN 210 to "Inversely Render" a hyperspectral image with the differentiable dispersion model 110 in the loop.

The spectral unmixing system 100 includes the generative dispersion model 110 that generates and renders spectral endmember variation and other optical properties for various pure materials based on initial conditions and a measured spectra b. The spectral unmixing system 100 aims to recreate the measured spectra b using the dispersion model 110 by identifying one or more endmember spectra present in the measured spectra b. The endmember spectra are aggregated into a matrix A. The spectral unmixing system 100 further estimates dispersion model parameters $\wedge$ to fit the endmember spectra A to the dispersion model 110. The spectral unmixing system 100 further provides a linear unmixing pipeline 120 for linearly unmixing an observed spectrum of the material. The linear unmixing pipeline 120 alternates between updating the dispersion model parameters $\wedge$ for the dispersion model 110 and optimizing abundances x using a least-squares model. The output of the system 100 includes updated dispersion model parameters $\wedge$ for the dispersion model 110, optimized abundances x for the material in question, and modelled spectra Ax=bout.

Further, the system 100 is unique in that it uses the generative dispersion model 110 to account for spectral variability in the unmixing pipeline 120, and iteratively solves spectral unmixing in a self-supervised fashion using analysis-by-synthesis optimization with the dispersion model 110 as a "synthesis" step.

Figure 4:
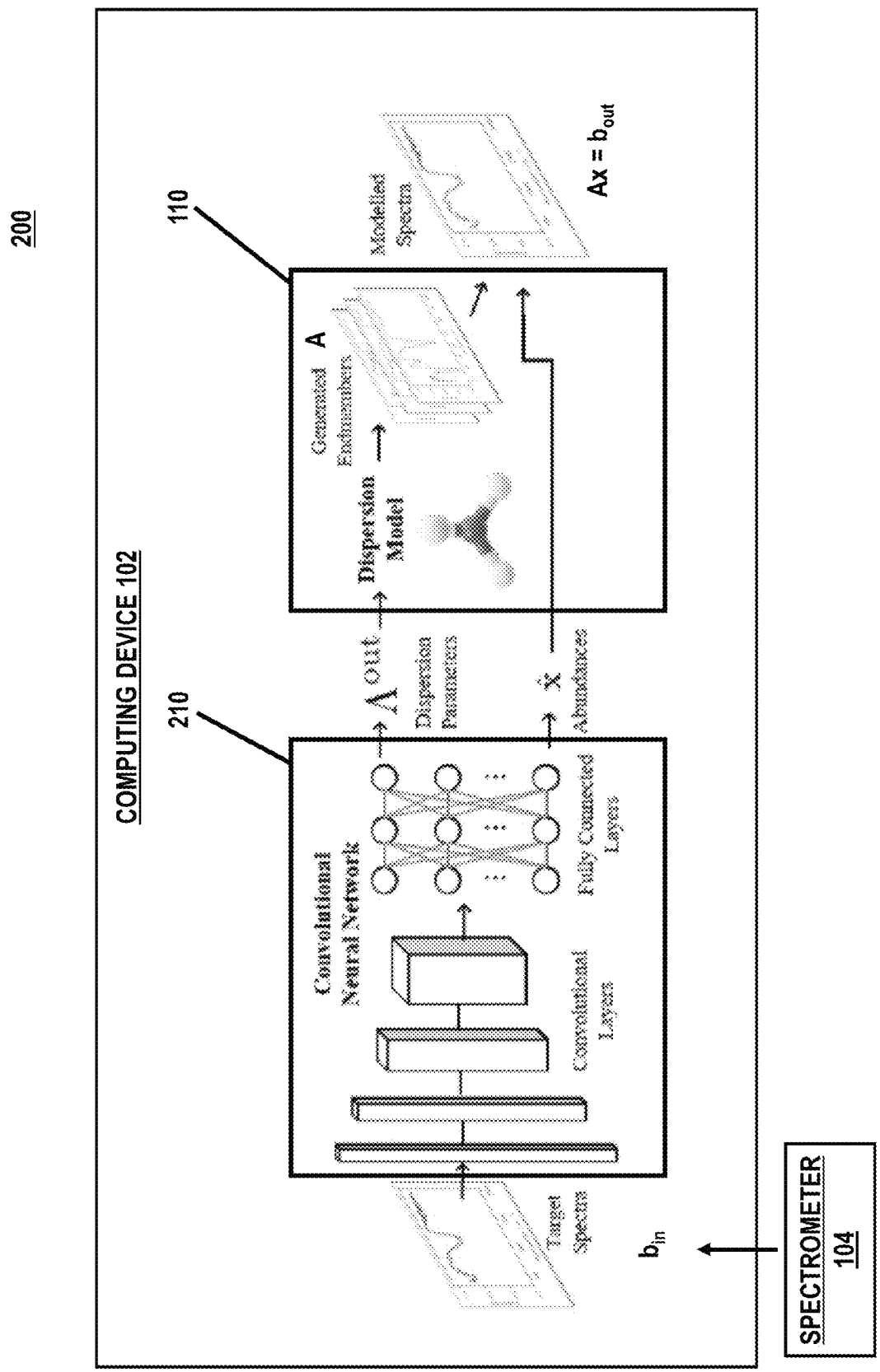
FIG. 4 is a diagram showing a second embodiment of a differentiable programming pipeline to perform spectral unmixing using inverse rendering.

A second embodiment of the system 200 is featured in FIG. 4 and includes a convolutional neural network 210 for identifying optimal dispersion model parameters $\wedge$ and abundances x without the need for iterative computing. The optimal dispersion model parameters $\wedge$ and abundances x can then be passed through the dispersion model 110 to generate a modeled spectra that matches the measured spectra b.

Introduction

Linear mixing assumes electromagnetic waves produced from pure materials combine linearly and are scaled by the material abundance. Mathematically this is expressed as b=Ax+$\eta$ where b is the measured spectra, A is a matrix whose columns are the pure material spectra, $\eta$ is the measurement noise, and x is the abundance of each pure material. In simpler terms, the abundance x denotes a proportion of each observed material. Linear mixing assumes that the pure material spectra, referred to as endmember spectra, is known before-hand. Nonlinear effects are known to occur when photons interact with multiple materials within a scene.

Figure 2:
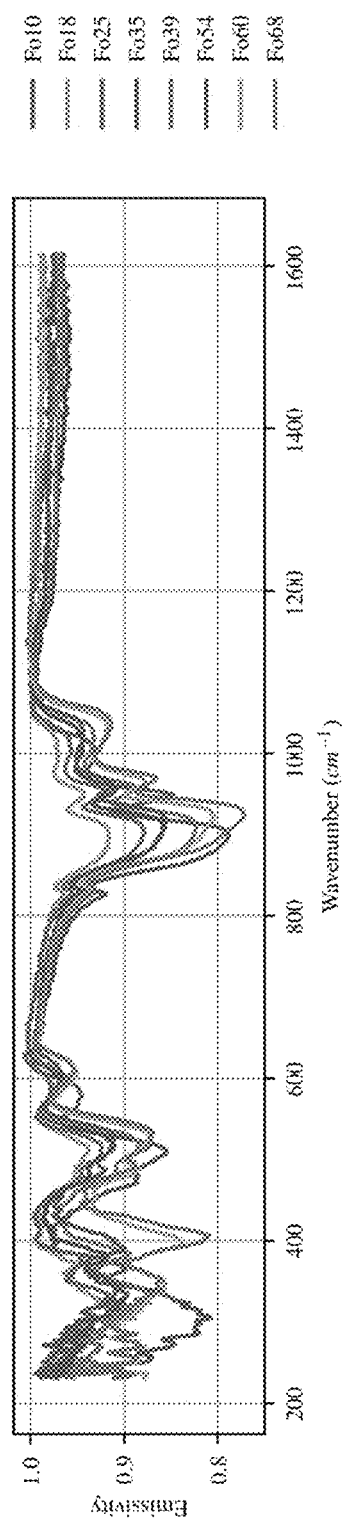
FIG. 2 is a graphical representation showing spectral variability of olivine, where a variable ratio of bonds of olivine causes light absorption bands to shift in frequency and strength.

A key challenge that affects both linear and nonlinear mixing models is that pure materials have an inherent variability in their spectral signatures, and thus cannot be represented by a single characteristic spectrum. Spectral variability of endmembers is caused by subtle absorption band differences due to factors such as different grain sizes or differing ratios of molecular bonds, as shown in FIG. 2. Since variability causes significant errors in unmixing algorithms, it is an active area of research.

Recently, differentiable programming has become a popular research area due to its potential to bridge gaps between physics-based and machine learning-based techniques for computer vision and graphics. One key contribution of the present spectral unmixing system 100 is to leverage differentiable programming by modelling the variation of spectra of an observed mixture using the dispersion model 110, and incorporating this differentiable dispersion model 110 into an end-to-end spectral unmixing pipeline 120 that identifies abundances of each detected material in the observed mixture. Such an approach has the capacity to un-mix scenes with a large amount of variability, while constraining the predictions to be physically plausible. These physically plausible variations of endmember spectra also provide additional science data as the variation of absorption bands can reveal properties about the composition and history of the material. The present system 100 uses the generative physics dispersion model 110 to account for spectral variability in the linear unmixing pipeline 120.

Specific Contributions

Referring to FIGS. 1, and 3-5, the present spectral unmixing system 100 provides the dispersion model 110 to generate and render spectral variation for various pure materials. Further, dispersion model parameters $\wedge$ for the dispersion model 110 are optimized via gradient descent to find optimal dispersion model parameters $\wedge$ for the spectral variation of an observed mixture. The dispersion model 110 is incorporated into the spectral unmixing pipeline 120 utilizing differentiable programming to perform analysis-by-synthesis optimization of the dispersion model parameters $\wedge$. Analysis-by-synthesis is solved within the spectral unmixing pipeline 120 via alternating minimization optimization and requires no training data.

Further, a second embodiment of the present system, designated 200, defines the computing device 102 that includes a convolutional neural network 210 that jointly estimates parameters $\wedge$ for the dispersion model 110 and mineral abundances x for spectral unmixing of a measured spectra b taken from the spectrometer 104. This system 200 requires training data but is computationally efficient at test time and outperforms analysis-by-synthesis and other state-of-the-art methods for determining parameters $\wedge$ for the dispersion model 110.

Extensive analysis of the systems 100 and 200 is provided with respect to noise and convergence criteria. To validate, both synthetic and real datasets are used for testing using hyperspectral observations in the visible and near infrared (VNIR), and mid to far infrared (IR). The datasets also span three different environments from laboratory, aircraft, and satellite-based spectrometers. It was shown that the systems 100 and 200 achieve state-of-the-art across all datasets and are compared against several baselines from literature.

Dispersion Model and End-to-End Spectral Unmixing System

The present approach to hyperspectral unmixing as disclosed herein features two main components: (1) use of the physically-accurate dispersion model 110 for pure endmember spectra, and (2) a differentiable programming system 120 which is incorporated with the model 110 to perform spectral unmixing. This approach has synergistic benefits of leveraging prior domain knowledge while learning from data. The system 100 solves spectral unmixing in a self-supervised fashion using an analysis-by-synthesis optimization pipeline 120 with the dispersion model 110 as the synthesis step. Further, it is shown how inverse rendering via a convolutional neural network (CNN) 210 can learn parameters $\wedge$ of the dispersion model 110 to help speed up the present system 100 and improves performance when training data is available.

Dispersion Model

First, the dispersion model 110 for generating endmember spectra will be discussed. "Endmember" and/or "endmember spectra" is what the spectral curve is called for emissivity f as a function of wavenumber w. Each pure material has a characteristic endmember spectrum, although spectra can vary, which is the problem the present disclosure aims to solve. Let $\epsilon^{measured}(\omega)$ be endmember spectra which has been measured, typically in a lab or in the field, whose emissivity is sampled at different wavenumbers: $[\epsilon^{measured}(\omega_1), \ldots \epsilon^{measured}(\omega_N)]^T$. The present system 100 presents model $\epsilon^{model}(\wedge;\omega)$ with parameters $\wedge$ such that the following loss is minimized: $L(\wedge) = \Sigma_{i=1}^{N} (\epsilon^{measured}(\omega_i) - \epsilon^{model}(\wedge;\omega_i))^2$. That is, parameters $\wedge$ that dictate the model emissivity of an endmember spectrum are fitted to the measured spectrum such that a loss between an endmember spectrum generated by the dispersion model 110 and an actual measured endmember spectrum is minimized. In practice, regularization and constraints need to be added to this endmember loss for better fitting which is described after the derivation of the dispersion model 110.

Derivation of the Dispersion Model

Figure 3:
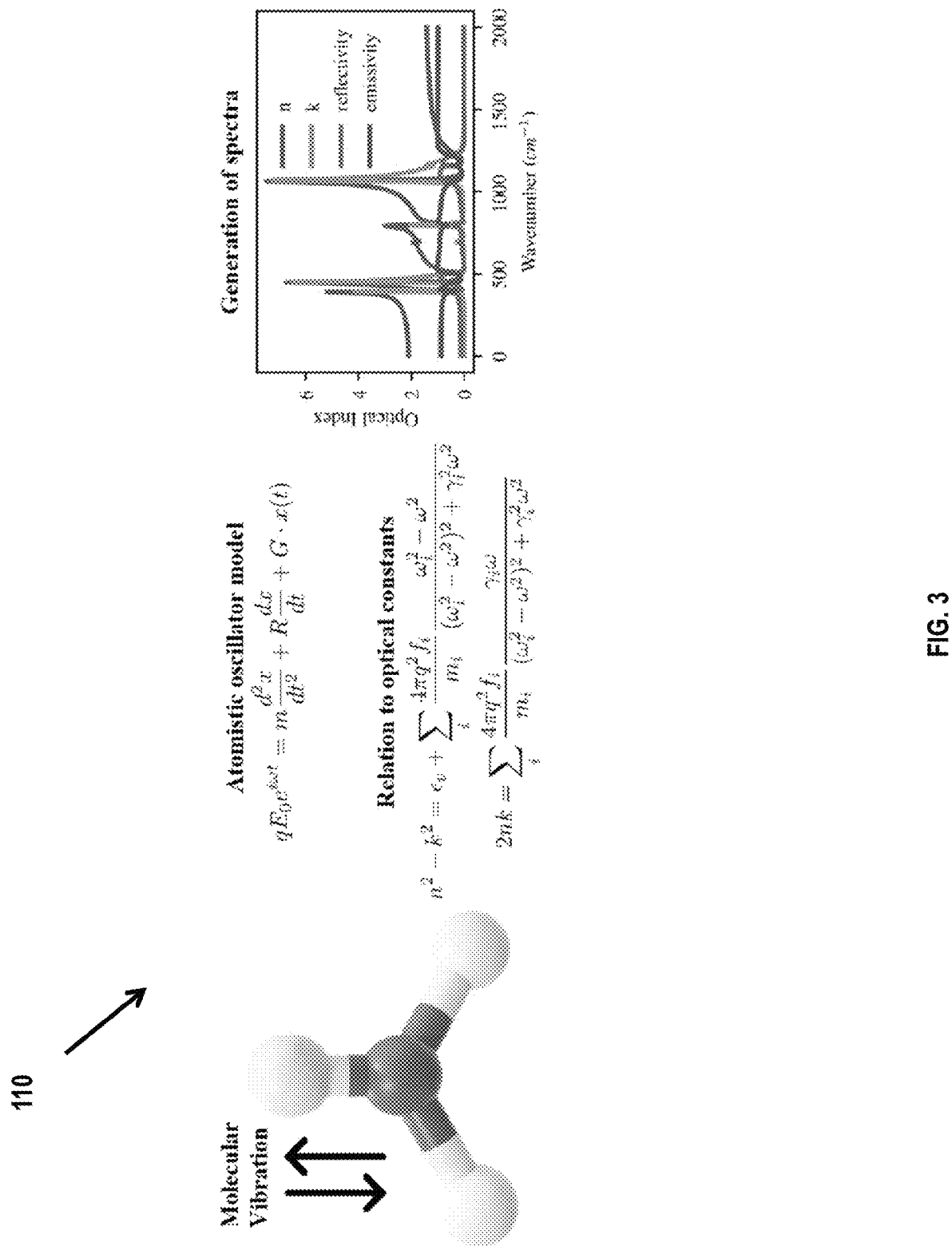
FIG. 3 is a conceptual diagram showing a relation between molecular optical properties and atomic oscillation, relating emissivity and reflectivity of a material to its molecular structure to form a generative model used for the formation of spectral variation in the differentiable programming pipeline of FIG. 1.

The dispersion model 110 of endmember spectra is derived from an atomistic oscillator driven by electromagnetic waves impinging on the molecular structure of the pure material as illustrated in FIG. 3. FIG. 3 shows a conceptual diagram of the dispersion model 110, and how it generates emissivity curves as a function of wavelength. The dispersion model 110 is outlined below based on equations derived from that analysis.

Let $\wedge = [\rho, \omega_0, \gamma, \epsilon_r]$ be a matrix of spectral parameters, where $\rho, \omega_0, \gamma, \epsilon_r \in \mathbb{R}^K$ and $K$ is a model hyperparameter corresponding to the number of distinct mass-spring equations used to model the emissivity. $\rho$ is the band strength, $\omega_0$ is the resonant frequency, $\gamma$ is the frictional force (dampening coefficient), and $\epsilon_r$ is relative dielectric permeability. Note: usually $\epsilon_r$ is a constant vector which does not vary with K. Thus, $\wedge \mathbb{R}^{K+4}$. The refractive index terms n, k are given as follows:

$$n(\wedge;\omega) = \sqrt{\frac{\theta + b}{2}}, \quad k(\wedge;\omega) = \frac{\phi}{n(\wedge;\omega)}, \quad (1)$$

where the expressions for $\theta, \beta, \phi$ are given as follows:

$$\theta = \epsilon_r + \sum_{k=1}^{K} 4\pi\rho_k\omega_{0k}^2 \frac{(\omega_{0k}^2 - \omega^2)}{(\omega_{0k}^2 - \omega^2)^2 + \gamma_k^2\omega_{0k}^2\omega^2}, \quad (2)$$

$$b = \sqrt{\theta^2 + 4\phi^2}, \quad \phi = \sum_{k=1}^{K} 2\pi\rho_k\omega_{0k}^2 \frac{\gamma_k\omega_{0k}\omega}{(\omega_{0k}^2 - \omega^2)^2 + \gamma_k^2\omega_{0k}^2\omega^2}. \quad (3)$$

Note that subscript k denotes the $k^{th}$ coordinate of the corresponding vector. Also there is another useful relation that $n^2 - k^2 = \theta$, $nk = \phi$. The complex refractive index is then defined as $\tilde{n}(\wedge;\omega) = n(\wedge;\omega) - i \cdot k(\wedge;\omega)$ where $i = \sqrt{-1}$ is the imaginary number. Hence, the emissivity can be calculated as follows $$\epsilon(\wedge;\omega) = 1 - R(\wedge;\omega), \quad \text{where } R(\wedge;\omega) = \left|\frac{\tilde{n}(\wedge;\omega) - 1}{\tilde{n}(\wedge;\omega) + 1}\right|^2. \quad (4)$$

When considering minerals, $M \in N$, the number of optical axes of symmetry in crystal structures is introduced, (eg. 2 axes of symmetry in quartz) to define the full model:

$$\epsilon^{model}(\wedge;\omega) = \sum_{m=1}^{M} \alpha_m \cdot \epsilon(\wedge_m;\omega) \text{ such that } \sum_{m=1}^{M} \alpha_m = 1, \alpha_m \geq 0, \quad (5)$$

where a different parameter matrix $\wedge_m$ and weight $\alpha_m$ is used for each optical axis of symmetry.

The dispersion model 110 has been primarily used to analyze optical properties of materials to determine n and k, which then can be subsequently applied to optical models like radiative transfer. After n and k are found, spectra such as reflectance, emissivity, and transmissivity can be generated. In particular, it should be noted that fine-grained control of the parameters $\wedge$ of the dispersion model 110 can realistically render spectral variation that occurs in hyperspectral data. The spectral unmixing system 100 leverages these properties for spectral unmixing.

Endmember Fitting

Using the dispersion model 110 presented above, the model parameters $\wedge$ must be robustly estimated to fit the spectra $\epsilon^{measured}$ captured in a lab or in the field. In some embodiments, parameters $\wedge$ are iteratively optimized with the abundances x in an alternating fashion until a loss between measured spectra b and fitted endmember spectra Ax is minimized. To fit the parameters $\wedge$ of the dispersion model 110 to the measured spectra b, gradient descent must be performed to efficiently find these parameters $\wedge$. Using chain rule on the loss function, it can be shown that $$\frac{\partial L}{\partial \wedge_{ij}} = \frac{\partial L}{\partial \epsilon^{model}} \frac{\partial \epsilon^{model}}{\partial \wedge_{ij}}$$

where $ij$ corresponds to that element of the parameter matrix, and all expressions are scalars once the coordinate is specified. While the partial derivatives can be calculated explicitly via symbolic toolboxes, the resulting expressions are too long to be presented here. For simplicity and ease of use, the autograd function in PyTorch was used to automatically compute derivatives for the model 110 with backpropagation.

One main challenge in performing endmember fitting is that the dispersion model 110 is not an injective function, and hence is typically not identifiable. In other words, more than one $\wedge$ can result in the same fit. This can be solved, in-part, through regularization to enforce sparsity. In the present implementation, the dispersion model 110 is initialized with K=50 rows of the parameter matrix. Since the parameter p controls the strength of the absorption band, small values of p do not contribute much energy to the spectra (unnecessary absorption bands) and can be pruned.

Experimentation showed that after performing sparse regression by penalizing the $L_1$ norm of $\rho$, K is typically reduced to around 10-15.

Figures 6A, 6B, 6C:
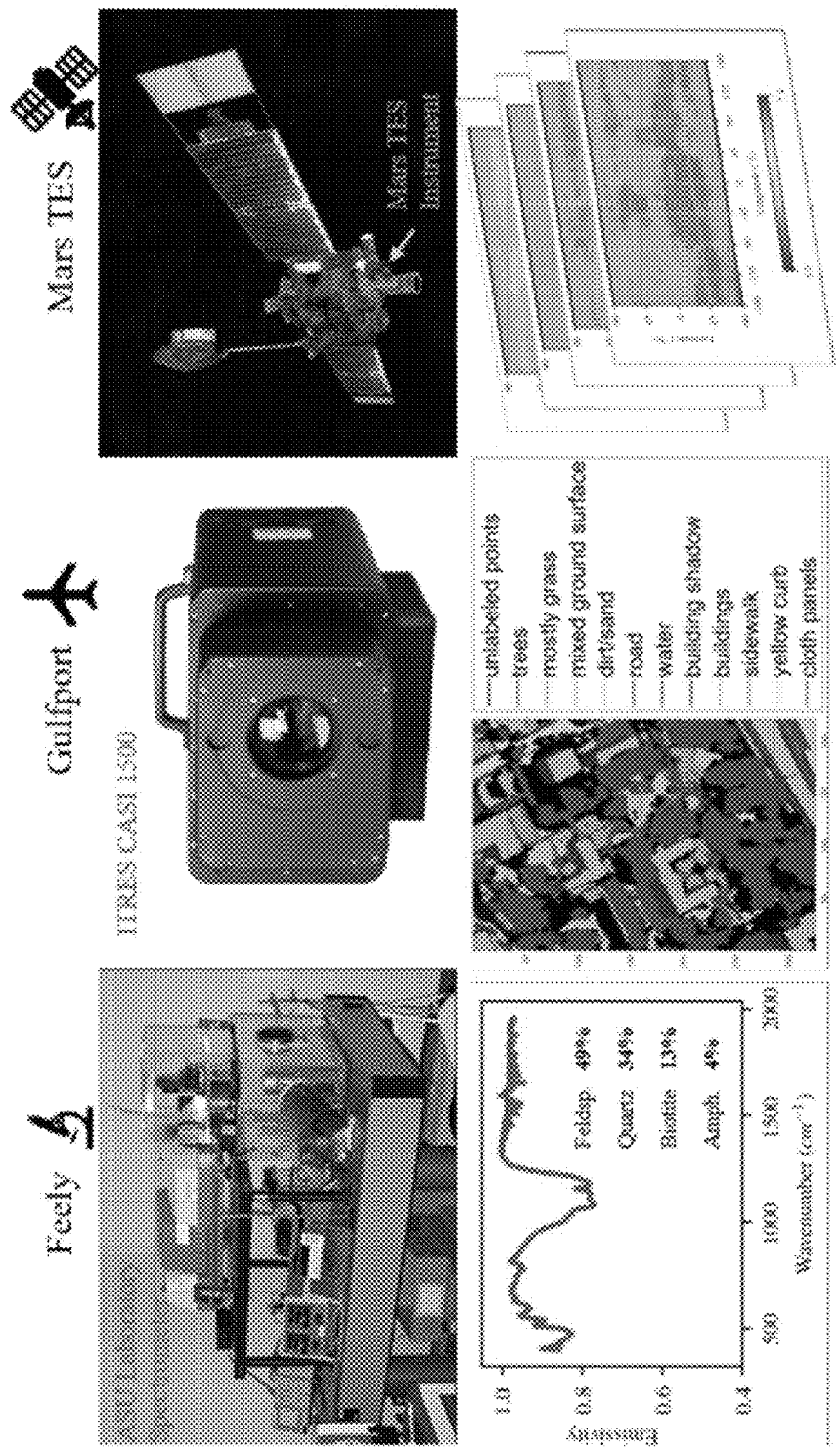
FIGS. 6A, 6B and 6C are respective images showing representative data for three datasets (laboratory, aircraft and satellite measurements, respectively) as well as ground truth ranges for abundance analysis under a microscope (FIG. 6A), pixel labels of land types for spectral classification (FIG. 6B), and Martian data with no ground truth labels (FIG. 6C)

Thus, the modified sparse regression problem may be written as:

$$\underset{\wedge_{min} \leq \wedge \leq \wedge_{max}}{\operatorname{argmin}} \sum_{i=1}^{N} \left(\epsilon^{real}(\omega_i) - \epsilon^{model}(\wedge; \omega_i)\right)^2 + \lambda_p \|\rho\|_1, \quad (6)$$

where $\wedge_{min}$ and $\wedge_{max}$ restrict the variation of the dispersion parameters $\wedge$ to a plausible range. In addition, endmembers (particularly minerals) can have multiple optical axes of symmetry described by separate spectra, which has been noted in the literature. Without prior knowledge of the number of axes for every material encountered, this optimization is run for a single and double axes, and the one with the lowest error is selected. FIGS. 6A and 6B show examples of modelled vs. measured spectra b.

Despite the fact that this regression problem is nonconvex, it is solved using gradient descent with a random initialization; this is known to converge to a local minimum with a probability of 1. A global minimum is not necessary at this stage. Endmember fitting is used to provide a good initialization point for the subsequent alternating minimization procedure introduced in the next subsection.

Differentiable Programming for End-to-End Spectral Unmixing

Analysis-by-Synthesis Optimization: The full end-to-end spectral unmixing system 100 including the dispersion model 110 and linear unmixing module 120 is shown in FIG. 1. The model emissivity of an endmember spectra dispersion model $\epsilon^{model}(\wedge; \omega)$ is initially fit to a measured endmember spectra $\epsilon^{measured}(\omega)$ and is then aggregated into the columns of matrix A, where the columns of A are each a pure material spectra associated with endmembers present in the measured spectra b. Unmixing pipeline 12 linearly unmixes the observed spectra b by solving a regularized least-squares optimization:

$$\operatorname{argmin}_x \|b - Ax\|_2^2 + \lambda \|x\|_p$$

subject to sum-to-one and non-negativity constraints $\|x\|_1=1$, x>0. Given these constraints, one cannot impose sparsity with the usual $L_1$ norm. Instead, the $L_p$ norm is used to induce sparsity for predicted abundances x.

The key to the spectral unmixing system 100 is that everything is fully differentiable, and thus the following equation can be minimized:

$$\underset{x,\wedge\in[\wedge_{min},\wedge_{max}]}{\operatorname{argmin}} \|b - A(\wedge)x\|_2^2 + \lambda\|x\|_p \text{ such that } \|x\|_1 = 1, x \geq 0. \quad (7)$$

with respect to both the parameters of the dispersion model $\wedge$ and the abundances x. This gives the recipe for hyperspectral unmixing: first, perform endmember fitting to initialize $A(\wedge)$. Then, solve Equation (7) in an alternating fashion for x and $\wedge$. One could also solve this equation jointly for both unknowns, however, it was found that the alternating optimization was faster and converged to better results.

The optimization problem established in Equation (7) is an alternating minimization problem and is unfortunately not convex. One popular approach to tackle nonconvex problems is to find a good initialization point, and then execute a form of gradient descent. Inspired by this, $A(\wedge)$ is first initialized by performing endmember fitting using Equation (6) as described in the previous subsection. Experiments that have been conducted indicate that this provides a useful initialization for our subsequent step. The unmixing pipeline 120 performs alternating minimization on Equation (7) for x and $\wedge$. Note that each iteration of the resulting alternating minimization involves the solution of a sub-problem which has a convergence rate which depends on the condition number of the matrix $A(\wedge)$.

In the ideal scenario, this initial matrix $A(\wedge)$ would consist of the endmember spectra that fully characterizes the mixed spectra b. However, since spectra for the same material can significantly vary (see FIG. 2), the initialization can be slightly off and thus it is important to follow up with Equation (7) to obtain a better fit. Note that this optimization problem is solving for the maximum likelihood estimator under a Gaussian noise model. The optimization technique embodied by the present system 100 is performing analysis-by-synthesis, as given a single observation b, the dispersion model synthesizes endmember variation until a good fit is achieved.

Inverse Rendering of Dispersion Model Parameters. The previous analysis-by-synthesis optimization does not require training data in order to perform spectral unmixing. However, there is room for even more improvement by using labeled data to help improve the parameter fitting of the model in the synthesis step. A convolutional neural network (CNN) 210 is trained to predict the parameters $\wedge$ for a generative model, known as inverse rendering in other domains. In FIG. 4, this inverse rendering concept is shown, and how it can be fed into the system 200 for end-to-end spectral unmixing.

The CNN 210 architecture consists of several convolutional layers 210A followed by a series of fully-connected layers 210B. Using the CNN 210 for inverse rendering is significantly faster at test time as compared to the analysis-by-synthesis optimization. However, the use of the CNN 210 does require training data, which is often unavailable for certain tasks/datasets.

Figure 5:
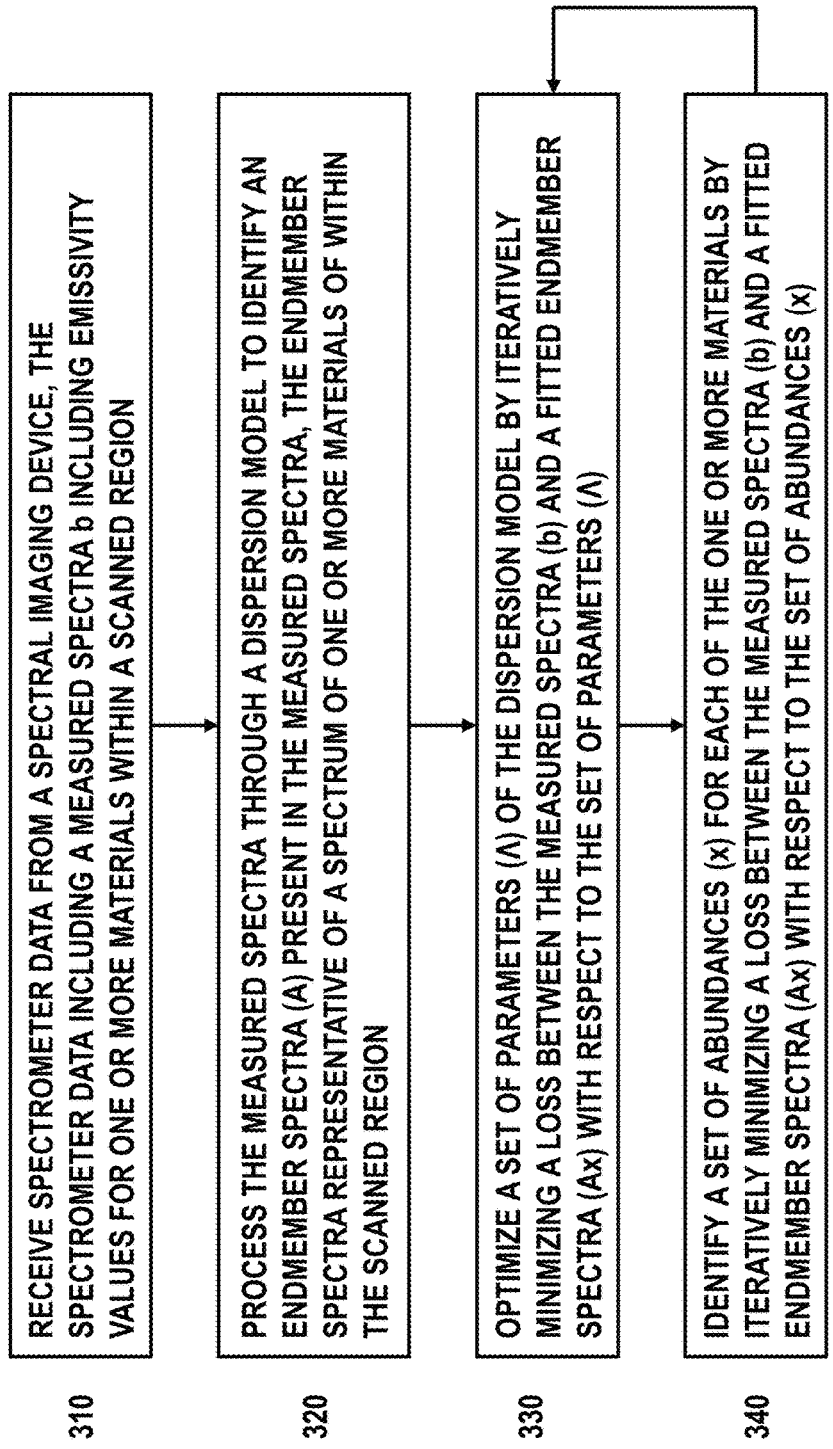
FIG. 5 is a diagram showing a process flow for hyperspectral unmixing using the system of FIG. 1.

FIG. 5 illustrates a simplified process 300 for hyperspectral unmixing using the system 100. At block 310 of process 300, the computing system 102 receives spectrometer data from the spectral imaging device 104, the spectrometer data including a measured spectra b including emissivity values for one or more materials within a scanned region. At block 320, the dispersion model 110 process the measured spectra to identify an endmember spectra (A) present in the measured spectra b, the endmember spectra A representative of a spectrum of one or more materials of within the scanned region. At block 330, the unmixing pipeline 120 optimizes a set of parameters $\wedge$ of the dispersion model by iteratively minimizing a loss between the measured spectra b and a fitted endmember spectra Ax with respect to the set of parameters $\wedge$. At block 340, the unmixing pipeline 120 identifies a set of abundances x for each of the one or more materials by iteratively minimizing a loss between the measured spectra b and a fitted endmember spectra Ax with respect to the set of abundances x. Blocks 330 and 340 are both iteratively performed in an alternating fashion until the loss is minimized, Experimental Results Datasets. Three separate datasets were utilized to validate the present spectral unmixing system 100. In FIGS. 6A-6C, these datasets and their exemplar data are visually represented.

Feely et al. Dataset. 90 samples are utilized from the Feely et al. dataset of thermal emission spectra in the infrared for various minerals measured in the lab. Ground truth was determined via optical petrography, and a labeled endmember library is provided. The limited amount of data is challenging for machine learning methods, so the dispersion model 110 is used to generate 50,000 additional synthetic spectra for dataset augmentation.

Gulfport dataset. The Gulfport dataset contains hyperspectral aerial images in the visible and near-infrared (VNIR) along with ground truth classification labels segmenting pixels into land types (e.g. grass, road, building). Although the dataset is for spectral classification, it can also be used to benchmark unmixing algorithms by creating synthetic mixtures of pure pixels from the Gulfport dataset with random abundances x. Spectral classification (Gulfport) and unmixing (Gulfport synthetic) tasks are performed in the testing. Both datasets are split into a train and test set (although some methods do not require training data), and the training data is augmented with 50,000 synthetically generated mixtures from the dispersion model 110.

One main difficulty of this dataset is the endmembers identified correspond to coarse materials such as grass and road as opposed to pure materials. Such endmembers can significantly vary across multiple pixels, but this spectral variation is not physically described by the dispersion model 110. To solve this problem, K-means clustering is used to learn exemplar endmembers for each category (e.g. grass, road, etc). Then, the resulting centroid endmember can be fit to the dispersion model 110 to allow further variation such as absorption band shifts in the spectra. It was found that K=5 worked the best for the Gulfport dataset.

TES Martian Dataset. The Thermal Emission Spectrometer (TES) uses Fourier Transform Infrared Spectroscopy to measure the Martian surface. The TES utilizes pre-processing from Bandfield et al. and the endmember library used by Rogers et al. to analyze Mars TES data. There is no ground truth for this dataset, as the true abundance of minerals on the Martian surface is unknown, so other metrics such as reconstruction error of the spectra are considered.

Baselines. The present system 100 is compared against several state-of-the-art baselines in the literature. The basic linear unmixing algorithm is Fully Constrained Least Squares (FCLS) which solves least squares with sum-to-one and non-negativity constraints on the abundances x. Two state-of-the-art statistical methods are used for modelling endmember variability as distributions: the Normal Compositional Model (NCM) and the Beta Compositional Model (BCM). NCM and BCM use a Gaussian and Beta distribution respectively, perform expectation-maximization for unmixing, and require a small amount of training data to determine model parameters $\wedge$.

The present system 100 compares against two state-of-the-art deep learning networks by Zhang et al. The first network utilizes a 1D CNN (CNN-1D) architecture, while the second network utilizes a 3D CNN (but with 1D convolutional kernels) (CNN-3D). CNN-3D is only applicable to datasets with spatial information, and not testable on the Feely and Gulfport synthetic data. A modified CNN architecture was also created (CNN-1D Modified) to maximize the performance on the datasets by changing the loss function to MSE, removing max-pooling layers, and adding an additional fully connected layer before the output.

Endmember Fitting Results. To bootstrap both the analysis-by-synthesis and inverse rendering methods, good initial conditions for the dispersion parameters $\wedge$ need to be input to the dispersion model 110. Determining dispersion parameters $\wedge$ typically required detailed molecular structure analysis or exhaustive parameter searching methods. One main advantage of the present system 100 is that gradient descent is used to efficiently find parameter sets for different materials.

Figure 7B:
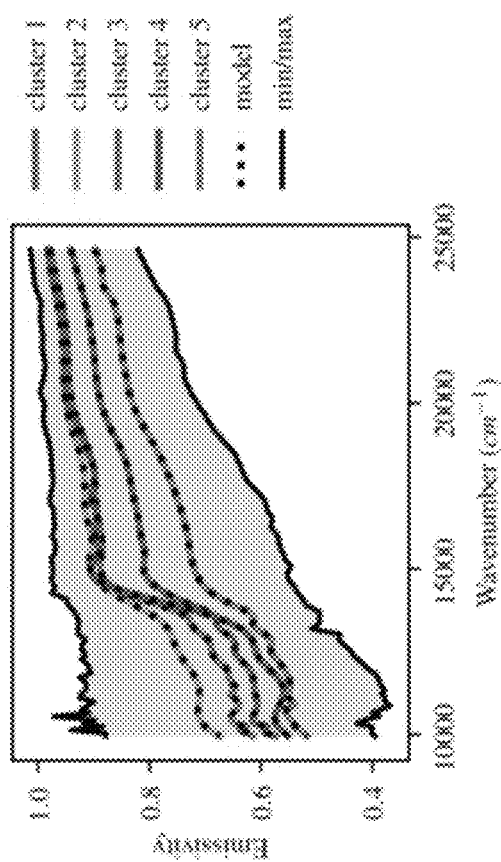
FIG. 7B is a graphical representation showing cluster centroids for labelled pixels in a dataset and respective model fits according to the system of FIG. 1 for each centroid.
Figure 7A:
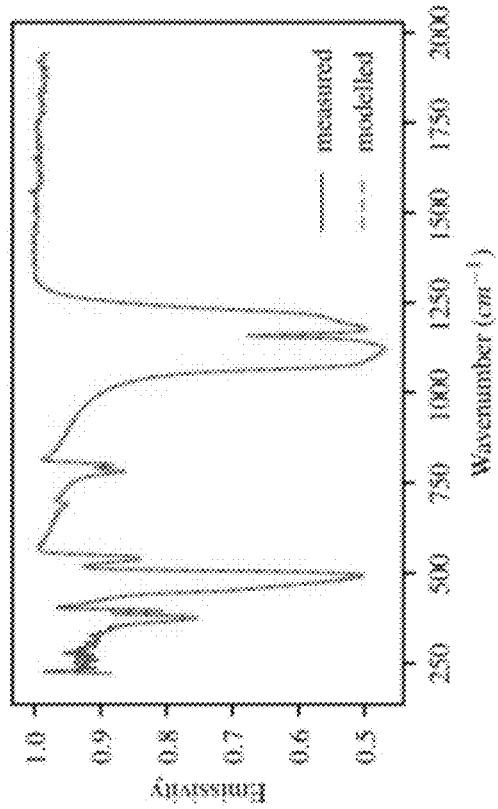
FIG. 7A is a graphical representation showing measured and modeled spectra for a quartz sample in infrared (IR)

In FIGS. 7A and 7B, qualitative results of endmember fitting are shown by minimizing the loss in Equation 6 using gradient descent. The reconstructed spectra achieves a low MSE with the measured spectra with an average MSE of 0.016 for the TES library, 0.0019 for the Feely library, and an MSE of 2.6e-5 on the Gulfport cluster centroids. Note that there is noise in the measurements, and so MSE is not an absolute metric of the fit to the true unknown spectra.

TABLE 1

Results: Table-Mean squared error of the abundance predictions vs. ground truth for Feely, Gulfport, and Gulfport synthetic datasets. The bold entries indicate top performance

| Dataset | FCLS [24] | NCM [50] | BCM [16] | CNN-1D [63] | CNN-3D [63] | CNN-1D Modified | Analysis-by-synthesis | Inverse Rendering |
|---|---|---|---|---|---|---|---|---|
| Feely [19] | 0.121 | 0.119 | 0.131 | 0.469 | N/A | 0.205 | 0.052 | 0.188 |
| Gulfport [20] | 0.75 | 0.799 | 0.800 | 1.000 | 0.497 | 0.297 | 0.45 | 0.272 |
| Gulfport Synthetic | 0.911 | 0.471 | 0.136 | 0.824 | N/A | 0.148 | 0.147 | 0.059 |

Spectral Unmixing Results. In Table 1, results on the Feely, Gulfport, and the Gulfport synthetic mixture datasets are shown. For Feely, the analysis-by-synthesis method achieved a MSE of 0.052, with the next closest method (NCM) achieving 0.119. Due to the Feely dataset only containing 90 test samples, the machine learning methods were trained on synthetic data which explains their lower performance as data mismatch. Thus, the low error of analysis-by-synthesis shows the utility of the dispersion model for modelling endmember variability, particularly in cases with low training data.

For the Gulfport dataset, the task was to predict the material present since the labeled data is for single coarse materials (e.g. road, grass, etc) at 100% abundance per pixel. Here, the deep learning methods of CNNs and Inverse Rendering have the highest performance. This is expected as there exists a large amount of training data to learn from. Note that Inverse Rendering performs the best at 0.272 MSE, demonstrating that the addition of a generative dispersion model to the output of the CNN improves performance over purely learned approaches. Also note that the present analysis-by-synthesis system 100 still has relatively high performance (0.45 MSE) without using any training data at all.

For the Gulfport synthetic mixture dataset, Inverse Rendering achieves the lowest MSE of 0.059, leveraging both physics-based modeling for spectral mixing as well as learns from available training data. The BCM and the analysis-by-synthesis methods embodied in the present system 100 both outperform the CNN methods, even though they do not have access to the training data. In fact, BCM even slightly outperforms the analysis-by-synthesis method, which could be because the sources of variation in this data are well-described by statistical distributions.

Speed of Methods. The additional capacity of adding statistical and physical models usually has a cost of speed in implementation. Averaged over 90 mixtures, the convergence for a single operation was FCLS-10ms, BCM-1.23s, NCM-18ms, CNN-33ms, Inverse Rendering-39ms, and analysis-by-synthesis-10.2s. Future work could potentially increase the speed of analysis-by-synthesis with parallel processing.

Noise analysis. Prior to spectral unmixing, emissivity is separated from radiance by dividing out the black-body radiation curve at the estimated temperature. In general, a Gaussian noise profile in the radiance space with variance $\sigma_{radiance}^2$ results in wavenumber dependent noise source in the emissivity space with the profile $\sigma^2(\omega) = \sigma_{radiance}^2 \cdot 1/B(\omega,T)$ where B is the black-body function given by Planck's law. In the noise experiments a black-body radiation curve is used for a 330K target, which is the approximate temperature the Feely dataset samples were held at. In FIG. 7A, it is shown that the emissivity noise is higher where the radiance signal is lower.

Figures 8A, 8B:
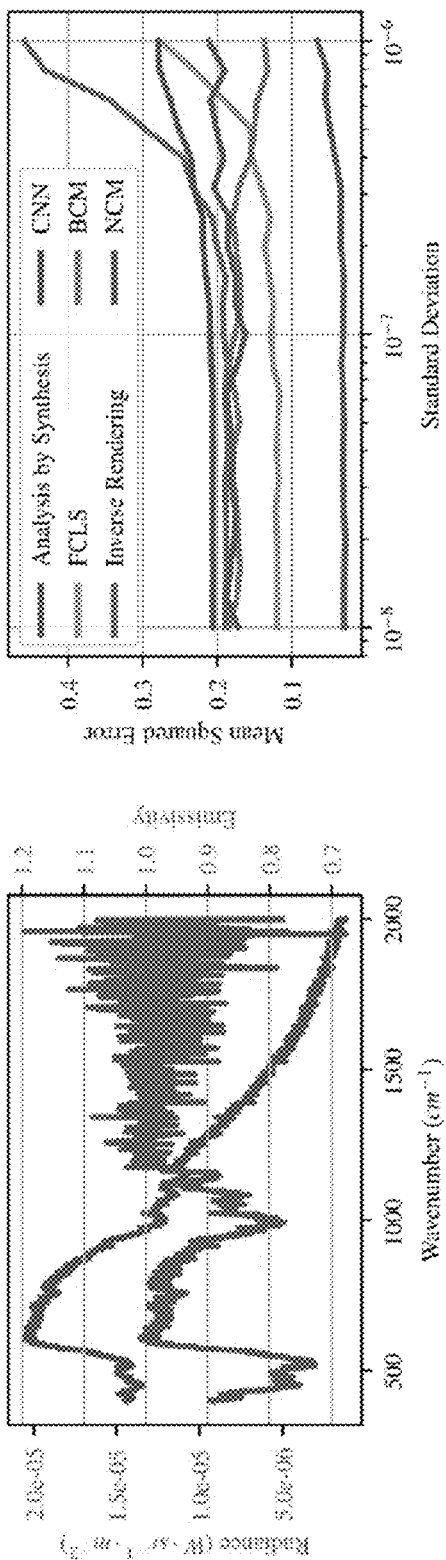
FIG. 8A is graphical representation showing a radiance profile of a spectra perturbed by Gaussian noise and a resulting emissivity profile after separating blackbody radiance.
FIG. 8B is a graphical representation showing robustness of the systems of FIGS. 1 and 4 against increasing amounts of noise.
Figure 9A:
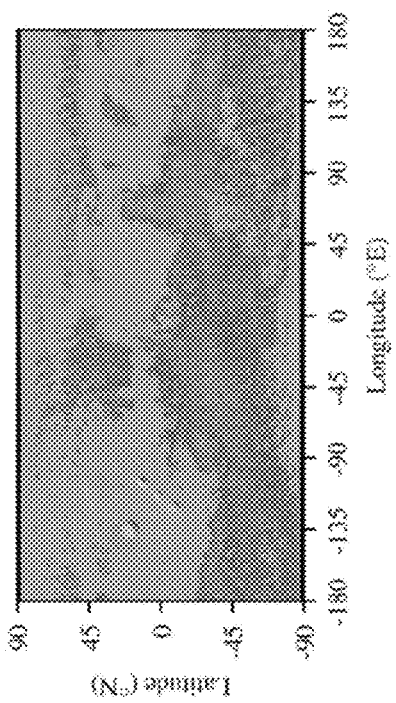
FIG. 9A is graphical representation showing a mineral map for hematite of the Martian surface produced by fully constrained least squares (FCLS) linear spectral mixture analysis.
Figure 9B:
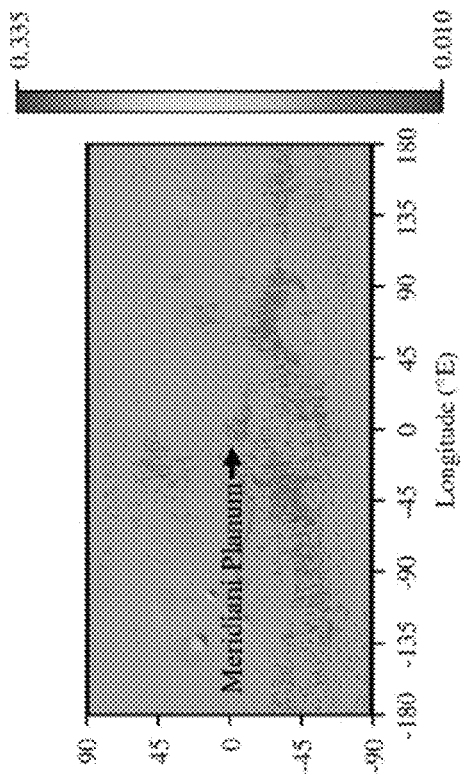
FIG. 9B is a graphical representation showing a mineral map for hematite of the Martian surface produced using the system of FIG. 1.

The present system 100 varied the noise power to determine the methods' robustness tested on 30 samples from the Feely dataset. In FIGS. 8A and 8B, it is shown that the analysis-by-synthesis embodied by the present system 100 still has the best performance in the presence of noise, and is relatively flat as noise increases compared to other methods. It should be noted that statistical methods, while having higher average error, seem to be robust to increased noise as they can handle random perturbations of each spectral band statistically. CNN and Inverse Rendering methods perform the worst for high noise, as these methods were trained on data without noise.

TES Data. The Mars TES data was unmixed using the analysis-by-synthesis method embodied by the present system 100 to demonstrate its utility on tasks where zero training data is available. The method produces mineral maps which correctly finds abundances of the mineral hematite at Meridiani Planum in FIGS. 9A and 9B. This is an important Martian mineral which provides evidence for liquid water having existed at some point on Mars, and has been verified by NASA's Opportunity Rover. Note how FCLS predicts many sites for hematite, while the present system 100 narrows down potential sites on the Martian surface, which is useful for planetary scientists. By allowing for spectral variation through the present system 100, lower RMS reconstruction error is shown than previous analysis of TES data. FCLS, which was previously used on TES because of the zero training-data problem, has an average RMS reconstruction error of 0.0043 while analysis-by-synthesis has an average of 0.0038. This is an exciting result as the present system 100 could provide a new suite of hyperspectral analysis tools for scientists studying the Martian surface.

Computer-Implemented System

Figure 10:
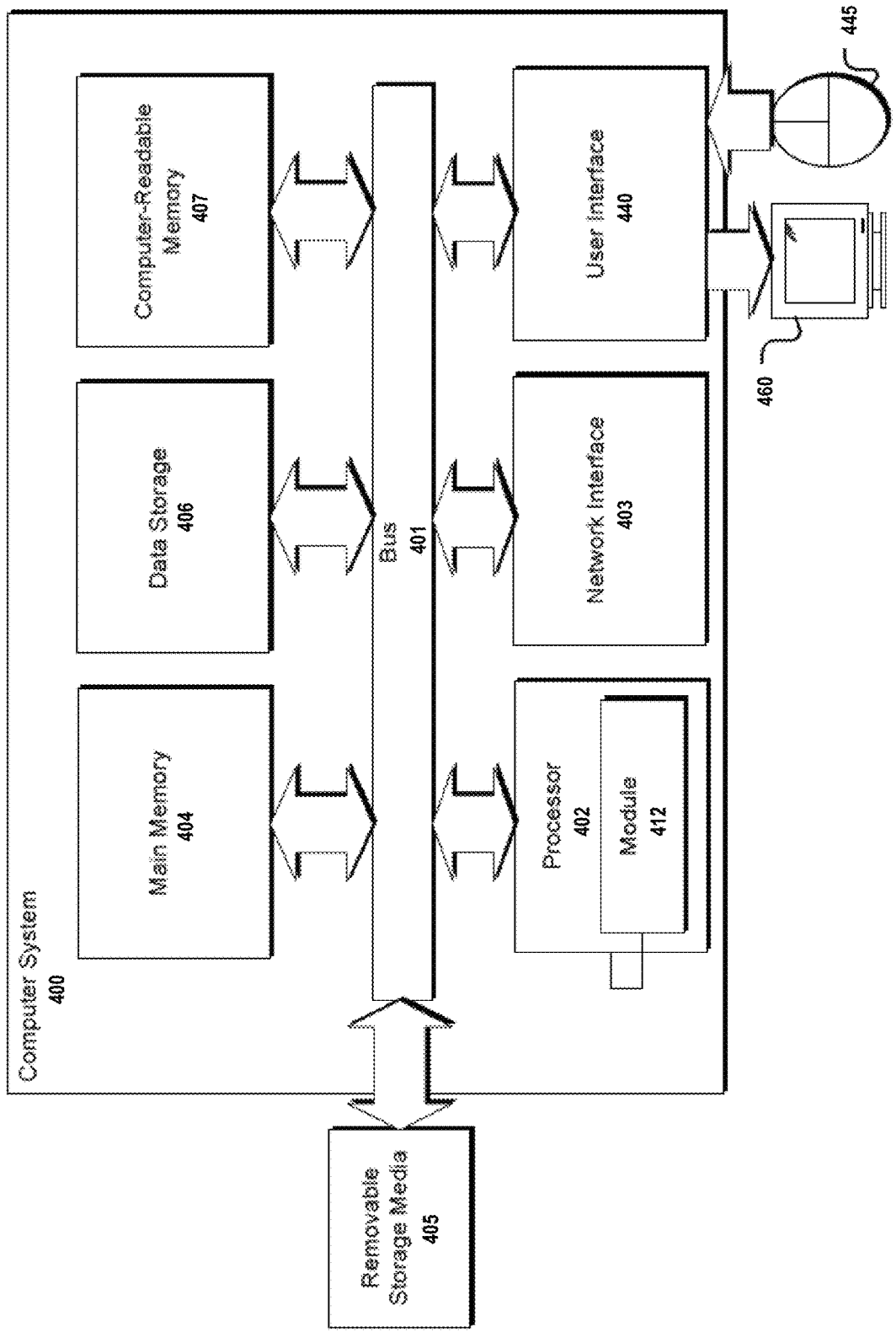
FIG. 10 is a simplified block diagram showing an example of a computing system that may implement various services, systems, and methods discussed herein.

FIG. 10 illustrates an example of a suitable computing and networking environment (computer system 400) which may be used to implement various aspects of the present disclosure. Example embodiments described herein may be implemented at least in part in electronic circuitry; in computer hardware executing firmware and/or software instructions; and/or in combinations thereof. Example embodiments also may be implemented using a computer program product (e.g., a computer program tangibly or non-transitorily embodied in a machine-readable medium and including instructions for execution by, or to control the operation of, a data processing apparatus, such as, for example, one or more programmable processors or computers). A computer program may be written in any form of programming language, including compiled or interpreted languages, and may be deployed in any form, including as a stand-alone program or as a subroutine or other unit suitable for use in a computing environment. Also, a computer program can be deployed to be executed on one computer, or to be executed on multiple computers at one site or distributed across multiple sites and interconnected by a communication network.

Certain embodiments are described herein as including one or more modules. Such modules are hardware-implemented, and thus include at least one tangible unit capable of performing certain operations and may be configured or arranged in a certain manner. For example, a hardware-implemented module may comprise dedicated circuitry that is permanently configured (e.g., as a special-purpose processor, such as a field-programmable gate array (FPGA) or an application-specific integrated circuit (ASIC)) to perform certain operations. A hardware-implemented module may also comprise programmable circuitry (e.g., as encompassed within a general-purpose processor or other programmable processor) that is temporarily configured by software or firmware to perform certain operations. In some example embodiments, one or more computer systems (e.g., a stand-alone system, a client and/or server computer system, or a peer-to-peer computer system) or one or more processors may be configured by software (e.g., an application or application portion) as a hardware-implemented module that operates to perform certain operations as described herein.

Accordingly, the term "hardware-implemented module" encompasses a tangible entity, be that an entity that is physically constructed, permanently configured (e.g., hardwired), or temporarily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software, in the form of the system applications based on embodiments of systems 100/200 or method 300 or otherwise, may include a hardware-implemented module and may accordingly configure a processor 402, for example, to constitute a particular hardware-implemented module at one instance of time and to constitute a different hardware-implemented module at a different instance of time.

Hardware-implemented modules may provide information to, and/or receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and may store the output of that operation in a memory device to which it is communicatively coupled. A further hardware-implemented module may then, at a later time, access the memory device to retrieve and process the stored output. Hardware-implemented modules may also initiate communications with input or output devices.

As illustrated, the computing and networking environment 400 may be a general purpose computing device 400, although it is contemplated that the networking environment 400 may include other computing systems, such as personal computers, server computers, hand-held or laptop devices, tablet devices, multiprocessor systems, microprocessor-based systems, set top boxes, programmable consumer electronic devices, network PCs, minicomputers, mainframe computers, digital signal processors, state machines, logic circuitries, distributed computing environments that include any of the above computing systems or devices, and the like.

Components of the general purpose computing device 400 may include various hardware components, such as a processing unit 402, a main memory 404 (e.g., a system memory), and a system bus 401 that couples various system components of the general purpose computing device 400 to the processing unit 402. The system bus 401 may be any of several types of bus structures including a memory bus or memory controller, a peripheral bus, and a local bus using any of a variety of bus architectures. For example, such architectures may include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The general purpose computing device 400 may further include a variety of computer-readable media 407 that includes removable/non-removable media and volatile/non-volatile media, but excludes transitory propagated signals. Computer-readable media 407 may also include computer storage media and communication media. Computer storage media includes removable/non-removable media and volatile/nonvolatile media implemented in any method or technology for storage of information, such as computer-readable instructions, data structures, program modules or other data, such as RAM, ROM, EPSOM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information/data and which may be accessed by the general purpose computing device 300. Communication media includes computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. For example, communication media may include wired media such as a wired network or direct-wired connection and wireless media such as acoustic, RF, infrared, and/or other wireless media, or some combination thereof. Computer-readable media may be embodied as a computer program product, such as software stored on computer storage media.

The main memory 404 includes computer storage media in the form of volatile/nonvolatile memory such as read only memory (ROM) and random access memory (RAM). A basic input/output system (BIOS), containing the basic routines that help to transfer information between elements within the general purpose computing device 400 (e.g., during start-up) is typically stored in ROM. RAM typically contains data and/or program modules that are immediately accessible to and/or presently being operated on by processing unit 402. For example, in one embodiment, data storage 406 holds an operating system, application programs, and other program modules and program data.

Data storage 406 may also include other removable/non-removable, volatile/nonvolatile computer storage media. For example, data storage 406 may be: a hard disk drive that reads from or writes to non-removable, nonvolatile magnetic media; a magnetic disk drive that reads from or writes to a removable, nonvolatile magnetic disk; and/or an optical disk drive that reads from or writes to a removable, nonvolatile optical disk such as a CD-ROM or other optical media. Other removable/non-removable, volatile/nonvolatile computer storage media may include magnetic tape cassettes, flash memory cards, digital versatile disks, digital video tape, solid state RAM, solid state ROM, and the like. The drives and their associated computer storage media provide storage of computer-readable instructions, data structures, program modules and other data for the general purpose computing device 400.

A user may enter commands and information through a user interface 440 or other input devices 445 such as a tablet, electronic digitizer, a microphone, keyboard, and/or pointing device, commonly referred to as mouse, trackball, or touch pad. Other input devices 445 may include a joystick, game pad, satellite dish, scanner, or the like. Additionally, voice inputs, gesture inputs (e.g., via hands or fingers), or other natural user interfaces may also be used with the appropriate input devices, such as a microphone, camera 450, tablet, touch pad, glove, or other sensor. These and other input devices 445 are often connected to the processing unit 402 through a user interface 440 that is coupled to the system bus 401, but may be connected by other interface and bus structures, such as a parallel port, game port or a universal serial bus (USB). A monitor 460 or other type of display device is also connected to the system bus 401 via user interface 440, such as a video interface. The monitor 460 may also be integrated with a touch-screen panel or the like.

The general purpose computing device 400 may operate in a networked or cloud-computing environment using logical connections of a network Interface 403 to one or more remote devices, such as a remote computer. The remote computer may be a personal computer, a server, a router, a network PC, a peer device or other common network node, and typically includes many or all of the elements described above relative to the general purpose computing device 400. The logical connection may include one or more local area networks (LAN) and one or more wide area networks (WAN), but may also include other networks. Such networking environments are commonplace in offices, enterprise-wide computer networks, intranets and the Internet.

When used in a networked or cloud-computing environment, the general purpose computing device 400 may be connected to a public and/or private network through the network interface 403. In such embodiments, a modem or other means for establishing communications over the network is connected to the system bus 401 via the network interface 403 or other appropriate mechanism. A wireless networking component including an interface and antenna may be coupled through a suitable device such as an access point or peer computer to a network. In a networked environment, program modules depicted relative to the general purpose computing device 400, or portions thereof, may be stored in the remote memory storage device.

It should be understood from the foregoing that, while particular embodiments have been illustrated and described, various modifications can be made thereto without departing from the spirit and scope of the invention as will be apparent to those skilled in the art. Such changes and modifications are within the scope and teachings of this invention as defined in the claims appended hereto.

What is claimed is:

1. A system, comprising:
   a spectral imaging device operable for measuring a measured spectra of one or more materials within a scanned region associated with a mixture; and
   a processor in operative communication with the spectral imaging device, the processor including instructions which, when executed, cause the processor to:
      receive spectrometer data from the spectral imaging device, the spectrometer data including a measured spectra b including emissivity values for one or more materials within a scanned region;
      process the measured spectra through a dispersion model to identify an endmember spectra present in the measured spectra, the endmember spectra representative of a spectrum of one or more materials of within the scanned region, wherein the dispersion model simulates realistic spectral variation to identify individual materials present in the mixture, wherein
         a set of parameters of the dispersion model are optimized by iteratively minimizing a loss between the measured spectra and a fitted endmember spectra with respect to the set of parameters; and
      identify an amount for each of the one or more materials to generate a set of amounts by iteratively minimizing a loss between the measured spectra and a fitted endmember spectra with respect to the set of amounts, wherein an amount for each of the one or more materials quantifies a presence of a respective material in the mixture.

2. The system of claim 1, wherein the fitted endmember spectra is expressed as a matrix product of a dispersion model parameter matrix including the endmember spectra and the set of amounts.

3. The system of claim 1, wherein the steps of optimizing the set of dispersion model parameters and identifying the set of amounts are repeated until the loss between the measured spectra and the fitted endmember spectra is minimized.

4. The system of claim 1, wherein including instructions which, when executed, further cause the processor to:
   perform gradient descent on a loss function to backpropagate a loss function throughout the dispersion model; and
   update each dispersion model parameter of the set of dispersion model parameters based on the result of the loss function with respect to each individual dispersion model parameter.

5. The system of claim 4, wherein the loss function is representative of a difference between the fitted endmember spectra and the measured spectra.

6. The system of claim 1, wherein the system alternates between optimizing the set of parameters and identifying the set of amounts in an iterative fashion.

7. The system of claim 1, wherein the dispersion model identifies a plurality of endmembers present in the scanned region.

8. A method, comprising:
   receive spectrometer data from the spectral imaging device, the spectrometer data including a measured spectra b including emissivity values for one or more materials within a scanned region;
   process the measured spectra through a dispersion model to identify an endmember spectra present in the measured spectra, the endmember spectra representative of a spectrum of one or more materials of within the scanned region;
   optimize a set of parameters of the dispersion model by iteratively minimizing a loss between the measured spectra and a fitted endmember spectra with respect to the set of parameters; and
   identify a set of amounts for each of the one or more materials by iteratively minimizing a loss between the measured spectra and a fitted endmember spectra with respect to the set of amounts, wherein an amount for each of the one or more materials quantifies a presence of a respective material in a mixture.

9. The method of claim 8, wherein the fitted endmember spectra is represented by a matrix product of the set of dispersion model parameters and the set of amounts.

10. The method of claim 8, wherein the difference between the measured spectra and a fitted endmember spectra is determined using regularized least squares optimization.

11. The method of claim 8, wherein gradient descent is performed on the loss function with respect to each individual dispersion model parameter prior to updating each dispersion model parameter.

12. The method of claim 8, wherein the dispersion model identifies a plurality of endmembers present in the scanned region.

13. The method of claim 8, wherein the dispersion model determines the endmember spectra by analyzing optical properties of the material to determine one or more refractive indexes of the material.

14. The method of claim 13, wherein the one or more refractive indexes are used to model the endmember spectra in the form of an emissivity curve.

15. The method of claim 13, wherein the endmember spectra is modeled for each of a plurality of optical axes of symmetry for crystal structures and wherein a different set of dispersion model parameters is determined for each optical axis of symmetry.

16. The method of claim 8, wherein the steps of optimizing the set of parameters and identifying the set of amounts are performed in an alternating fashion.

* * * * *